US011667104B2

(12) United States Patent
Chua et al.

(10) Patent No.: US 11,667,104 B2
(45) Date of Patent: Jun. 6, 2023

(54) MULTILAYER FILM WITH REVERSIBLE HAZE

(71) Applicant: Dow Global Technologies LLC, Midland, MI (US)

(72) Inventors: Rou Hua Chua, Singapore (SG); Wu Aik Yee, Singapore (SG); Bee Tin Low, Singapore (SG); Muthu Selva Annamalai Subramanian, Singapore (SG); Yutaka Maehara, Kanagawa (JP); Jian Wang, Singapore (SG)

(73) Assignee: Dow Global Technologies LLC, Midland, MI (US)

( * ) Notice: Subject to any disclaimer, the term of this patent is extended or adjusted under 35 U.S.C. 154(b) by 378 days.

(21) Appl. No.: 16/644,795

(22) PCT Filed: Sep. 5, 2017

(86) PCT No.: PCT/SG2017/050439
§ 371 (c)(1),
(2) Date: Mar. 5, 2020

(87) PCT Pub. No.: WO2019/050469
PCT Pub. Date: Mar. 14, 2019

(65) Prior Publication Data
US 2021/0070013 A1    Mar. 11, 2021

(51) Int. Cl.
| B29C 48/08 | (2019.01) |
| B29C 48/21 | (2019.01) |
| B29C 48/00 | (2019.01) |
| B29C 55/06 | (2006.01) |
| B29K 96/04 | (2006.01) |
| B29K 105/00 | (2006.01) |
| B32B 7/02 | (2019.01) |
| B32B 27/08 | (2006.01) |
| B32B 27/32 | (2006.01) |
| B29K 23/00 | (2006.01) |

(52) U.S. Cl.
CPC ............ *B32B 7/02* (2013.01); *B29C 48/0018* (2019.02); *B29C 48/08* (2019.02); *B29C 48/21* (2019.02); *B29C 55/06* (2013.01); *B32B 27/08* (2013.01); *B32B 27/32* (2013.01); *B29K 2023/08* (2013.01); *B29K 2096/04* (2013.01); *B29K 2105/0085* (2013.01); *B29K 2995/0018* (2013.01); *B29K 2995/0051* (2013.01); *B32B 2250/02* (2013.01); *B32B 2250/242* (2013.01); *B32B 2307/40* (2013.01); *B32B 2307/516* (2013.01)

(58) Field of Classification Search
CPC ..... B29C 48/0018; B29C 48/08; B29C 48/21; B29C 55/06; B29K 2995/0018; B29K 2995/0051; B29K 2023/08; B29K 2096/04; B29K 2105/0085
See application file for complete search history.

(56) References Cited

U.S. PATENT DOCUMENTS

| 4,206,980 A | 6/1980 | Krueger et al. |
| 4,483,965 A | 11/1984 | Ohba et al. |
| 6,727,317 B2 | 4/2004 | Kurja et al. |
| 7,498,282 B2 | 3/2009 | Patel et al. |
| 7,608,668 B2 | 10/2009 | Li Pi Shan et al. |
| 7,807,593 B2 | 10/2010 | Patel et al. |
| 7,893,166 B2 | 2/2011 | Shan et al. |
| 7,943,219 B2 | 5/2011 | Krueger |
| 7,947,793 B2 | 5/2011 | Marchand et al. |
| 2007/0092704 A1* | 4/2007 | Patel .................... D04H 1/4374 428/212 |
| 2008/0233418 A1* | 9/2008 | Krueger ................. B29C 48/08 528/502 B |
| 2014/0349094 A1* | 11/2014 | Jonza ....................... B32B 5/18 428/215 |
| 2017/0008263 A1 | 1/2017 | Hu et al. |
| 2017/0203554 A1 | 7/2017 | Takahashi et al. |
| 2017/0253012 A1 | 9/2017 | Chang et al. |
| 2019/0002737 A1* | 1/2019 | Runge ....................... B32B 5/18 |

FOREIGN PATENT DOCUMENTS

JP    H0691799 A    4/1994

OTHER PUBLICATIONS

Polyexcel, LLDPE Vs LDPE Vs HDPE: Which Should You Choose?, Published Dec. 9, 2019, accessed Jun. 29, 2022, url: https://polyexcel.com.br/en/product-news/lldpe-vs-ldpe-vs-hdpe-which-should-you-choose/#:~:text=LLDPE%20Density%20%E2%80%93%200.91%2D0.94g,it%20a%20low%20crystalline%20polyethylene.). (Year: 2019).*
F. Zuo, Macromolecules 2011, 44, 3670-3673.

* cited by examiner

*Primary Examiner* — Francisco W Tschen
*Assistant Examiner* — Elisa H Vera
(74) *Attorney, Agent, or Firm* — Quarles & Brady LLP

(57) ABSTRACT

The present disclosure provides a process. In an embodiment, the process includes elongating a multilayer film to a impart a haze value greater than 30% to the multilayer film. The multilayer film has at least two layers: (A) a core layer composed of an ethylene/α-olefin multi-block copolymer and (B) a first skin layer in contact with the core layer, the skin layer composed of an ethylene-based polymer. The process includes releasing the elongating force from the elongated multilayer film to form a hazed multilayer film having a haze value greater than 30%. The process includes stretching the hazed multilayer film to form a stretched multilayer film having a clarity value greater than 80%. The process includes relaxing the stretch force from the stretched multilayer film to form a relaxed multilayer film having a haze value greater than 30%.

15 Claims, No Drawings

MULTILAYER FILM WITH REVERSIBLE HAZE

Known are films composed of polymeric blends that exhibit transparency when stretched and opacity when the film is relaxed. Polymeric blends for such films typically include a crystalline/semi-crystalline polymer, such as a propylene-based polymer, that is miscible in an elastomeric polymer, such as an ethylene-based polymer.

The demand is growing for films that exhibit reversible transparency and opacity when stretched and relaxed. The art recognizes the need for elastic polymeric films that can be made from new and different materials other than incumbent propylene-based polymers and ethylene-based polymers in order to meet the demand for films with reversible transparency/opacity. Further desired in the art is a film that does not require propylene-based polymer in order to achieve reversible transparency and opacity.

SUMMARY

The present disclosure provides a process. In an embodiment, the process includes elongating a multilayer film to impart a haze value greater than 30% to the multilayer film. The multilayer film has at least two layers: (A) a core layer composed of an ethylene/α-olefin multi-block copolymer and (B) a first skin layer in contact with the core layer, the skin layer composed of an ethylene-based polymer. The process includes releasing the elongating force from the elongated multilayer film to form a hazed multilayer film having a haze value greater than 30%. The process includes stretching the hazed multilayer film to form a stretched multilayer film having a clarity value greater than 80%. The process includes relaxing the stretch force from the stretched multilayer film to form a relaxed multilayer film having a haze value greater than 30%.

In one aspect, there is provided a process comprising:
elongating a multilayer film to a impart a haze value greater than 30% to the multilayer film, the multilayer film having at least two layers (A) a core layer composed of an ethylene/α-olefin multi-block copolymer and (B) a first skin layer in contact with the core layer, the skin layer composed of an ethylene-based polymer; releasing the elongating force from the elongated multilayer film to form a hazed multilayer film having a haze value greater than 30%, the haze measured in accordance with ASTM D1003;
stretching the hazed multilayer film to form a stretched multilayer film having a clarity value greater than 80%, the clarity measured in accordance with ASTM D 1746-15; and
relaxing the stretch force from the stretched multilayer film to form a relaxed multilayer film having a haze value greater than 30%,
wherein strain-stress behavior for the elongating, the releasing, the stretching and the relaxing is measured at 500 mm/min at a 25° C., in accordance with ASTM D5459.

The present disclosure provides a multilayer film. In an embodiment, the multilayer film includes (A) a core layer composed of an ethylene/α-olefin multi-block copolymer, and (B) a first skin layer in contact with the core layer. The multilayer film is a mono-axially oriented hazed multilayer film and has a haze value greater the 30%. The hazed multilayer film exhibits a clarity value greater than 80% when subjected to a stretching force from at least 150% elongation to 300% elongation. The hazed multilayer film further exhibits a haze value greater than 30% when the stretching force is removed.

In another aspect, there is provided a multilayer film comprising:
(A) a core layer composed of an ethylene/α-olefin multi-block copolymer; and
(B) a first skin layer in contact with the core layer;
the multilayer film is a mono-axially oriented hazed multilayer film and has a haze value greater the 30%; and
the hazed multilayer film exhibits a clarity value greater than 80% when subjected to a stretching force from at least 150% elongation to less than 300% elongation, the hazed multilayer film further exhibiting a haze value greater than 30% when the stretching force is removed,
the haze measured in accordance with ASTM D1003 and the clarity measured in accordance with ASTM D 1746-15.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer. Ethylene plastomers/elastomers have a density from 0.870 g/cc to 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from 0.940 g/cc, or 0.945 g/cc, or 0.950 g/cc, or 0.953 g/cc to 0.955 g/cc, or 0.960 g/cc, or 0.965 g/cc, or 0.970 g/cc, or 0.975 g/cc, or 0.980 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Low density polyethylene" (or "LDPE") consists of ethylene homopolymer, or ethylene/α-olefin copolymer comprising at least one $C_3$-$C_{10}$ α-olefin that has a density from 0.915 g/cc to less than 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from The Dow Chemical Company), and MARLEX™ polyethylene (available from Chevron Phillips).

"Multi-component ethylene-based copolymer" (or "EPE") comprises units derived from ethylene and units derived from at least one $C_3$-$C_{10}$ α-olefin comonomer, such as described in patent references U.S. Pat. Nos. 6,111,023; 5,677,383; and 6,984,695. EPE resins have a density from 0.905 g/cc to 0.962 g/cc. Nonlimiting examples of EPE resins include ELITE™ enhanced polyethylene (available from The Dow Chemical Company), ELITE AT™ advanced technology resins (available from The Dow Chemical Company), SURPASS™ Polyethylene (PE) Resins (available from Nova Chemicals), and SMART™ (available from SK Chemicals Co.).

An "olefin-based polymer" or "polyolefin" is a polymer that contains more than 50 weight percent polymerized olefin monomer (based on total amount of polymerizable monomers), and optionally, may contain at least one comonomer. A nonlimiting examples of an olefin-based polymer is ethylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably.

"Single-site catalyzed linear low density polyethylenes" (or "m-LLDPE") are linear ethylene/α-olefin copolymers containing homogeneous short-chain branching distribution comprising units derived from ethylene and units derived from at least one $C_3$-$C_{10}$ α-olefin comonomer. m-LLDPE has density from 0.913 g/cc to less than 0.940 g/cc. Non-limiting examples of m-LLDPE include EXCEED™ metallocene PE (available from ExxonMobil Chemical), LUFLEXEN™ m-LLDPE (available from LyondellBasell), and ELTEX™ PF m-LLDPE (available from Ineos Olefins & Polymers).

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer. ULDPE and VLDPE each has a density from 0.887 g/cc to 0.915 g/cc. Nonlimiting examples of ULDPE and VLDPE include ATTANE™ ultra low density polyethylene resins (available from The Dow Chemical Company) and FLEXOMER™ very low density polyethylene resins (available from The Dow Chemical Company).

Test Methods

Clarity is the narrow-angle scattering that deflects light in small angles, so that the light intensity is concentrated within this narrow angular range. Clarity is measured in accordance with ASTM D 1746-15 using a BYK HazeGard PLUS 4725 apparatus, with results reported in percent (%).

Density is measured in accordance with ASTM D792, Method B. The result is recorded in grams per cubic centimeter (g/cc).

Stress-strain behavior in uniaxial tension is measured using a Zwick universal testing machine at 500 mm/min deformation rate at 25° C. The 300% elastic recovery is determined from a loading followed by unloading cycle to 300% strain, using ASTM D5459 standard test method for machine direction elastic recovery and permanent deformation and stress retention of stretch wrap film. Percent recovery for all experiments is calculated after the unloading cycle using the strain at which the load returned to the base line. The percent recovery is defined as:

$$\% \text{ Recovery}=100*(Ef-Es)/Ef$$

where Ef is the strain taken for cyclic loading and Es is the strain where the load returns to the baseline after the unloading cycle.

"Elongation" is a uni-axial stretching of a film, in the machine direction or in the transverse direction, to a degree sufficient to cause plastic deformation of the film. Results for elongation are expressed as a percent (%). Elongation is measured in accordance with the ASTM D882 testing procedure, using a standard specimen of nominal 25 mm thickness. The tensile testing is performed on a Zwick™ Model Z10 Tensile Tester at a 500 mm/minute testing speed with an initial jaw separation of 50 mm. Results are expressed as a percent (%).

"Haze" refers to the light scattering property of the film, low haze films scattering less visible light than high haze film. Haze is measured in accordance with ASTM D1003 using a HazeGard PLUS Hazemeter available from BYK™ Gardner of Melville, N.Y., with a light source CIE Illuminant C. Results for haze are reported in percent (%).

Melt index (MI) (I2) is measured using ASTM D1238 (190° C./2.16 kg) with results reported in grams per 10 minutes (g/10 min).

Differential Scanning Calorimetry (DSC)

Crystallization temperature, Tc, is determined from a DSC cooling curve as above except the tangent line is drawn on the high temperature side of the crystallization peak. Where this tangent intersects the baseline is the extrapolated onset of crystallization (Tc).

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the following Equation: % Crystallinity=(($H_f$)/292 J/g)×100

The heat of fusion ($H_f$) (also known as melt enthalpy) and the peak melting temperature are reported from the second heat curve. Peak crystallization temperature is determined from the cooling curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, *The Basis of Thermal Analysis, in Thermal Characterization of Polymeric Materials* 92, 277-278 (Edith A. Turi ed., 2d ed. 1997).

Gel Permeation Chromatography (GPC)

A high temperature gel permeation chromatography (GPC) system, equipped with Robotic Assistant Deliver (RAD) system is used for sample preparation and sample injection. The concentration detector is an Infra-red detector (IR-5) from Polymer Char Inc. (Valencia, Spain). Data collection is performed using a Polymer Char DM 100 Data acquisition box. The carrier solvent is 1,2,4-trichlorobenzene (TCB). The system is equipped with an on-line solvent degas device from Agilent. The column compartment is operated at 150° C. The columns are four Mixed A LS 30 cm, 20 micron columns. The solvent is nitrogen-purged 1,2,4-trichlorobenzene (TCB) containing approximately 200 ppm 2,6-di-t-butyl-4-methylphenol (BHT). The flow rate is 1.0 mL/min, and the injection volume is 200 µl. A "2 mg/mL" sample concentration is prepared by dissolving the sample in $N_2$ purged and preheated TCB (containing 200 ppm BHT), for 2.5 hours at 160° C., with gentle agitation.

The GPC column set is calibrated by running twenty narrow molecular weight distribution polystyrene standards. The molecular weight (MW) of the standards ranges from 580 g/mol to 8,400,000 g/mol, and the standards are contained in six "cocktail" mixtures. Each standard mixture has at least a decade of separation between individual molecular weights. The equivalent polypropylene molecular weights of each PS standard are calculated by using following equation, with reported Mark-Houwink coefficients for polypropylene (Th. G. Scholte, N. L. J. Meijerink, H. M. Schoffeleers, & A. M. G. Brands, J. Appl. Polym. Sci., 29, 3763-3782 (1984)) and polystyrene (E. P. Otocka, R. J. Roe, N. Y. Hellman, & P. M. Muglia, Macromolecules, 4, 507 (1971)):

$$M_{PP} = \left( \frac{K_{PS} M_{PS}^{a_{PS}+1}}{K_{PP}} \right)^{\frac{1}{a_{PP}+1}}, \quad (\text{Eq 1})$$

where $M_{pp}$ is PP equivalent MW, $M_{PS}$ is PS equivalent MW, log K and α values of Mark-Houwink coefficients for PP and PS are listed below.

| Polymer | α | log K |
|---|---|---|
| Polypropylene | 0.725 | −3.721 |
| Polystyrene | 0.702 | −3.900 |

A logarithmic molecular weight calibration is generated using a fourth order polynomial fit as a function of elution volume. Number average and weight average molecular weights are calculated according to the following equations:

$$M_n = \frac{\sum^i W f_i}{\sum^i \left(\frac{W f_i}{M_i}\right)}, \quad (\text{Eq 2})$$

$$M_w = \frac{\sum^i (W f_i * M_i)}{\sum^i (W f_i)}, \quad (\text{Eq 3})$$

where $Wf_i$ and $M_i$ are the weight fraction and molecular weight of elution component i, respectively.

$C^{13}$ Nuclear Magnetic Resonance (NMR)

Sample Preparation: samples are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C.

Data Acquisition Parameters: data is collected using a Bruker 400 MHz spectrometer equipped with a Bruker Dual DUL high-temperature CryoProbe. The data is acquired using 320 transients per data file, a 7.3 sec pulse repetition delay (6 sec delay+1.3 sec acq. time), 90 degree flip angles, and inverse gated decoupling with a sample temperature of 125° C. All measurements are made on non-spinning samples in locked mode. Samples are homogenized immediately prior to insertion into the heated (130° C.) NMR Sample changer, and are allowed to thermally equilibrate in the probe for 15 minutes prior to data acquisition. The NMR may be used to determine total weight percent of ethylene, e.g., with respect to the ethylene/α-olefin multi-block copolymer.

DETAILED DESCRIPTION

The present disclosure is directed to a process for producing a multilayer film having reversible haze. In an embodiment, the process includes elongating a multilayer film to a impart a haze value greater than 30% to the multilayer film. The multilayer film has at least two layers: (A) a core layer composed of an ethylene/α-olefin multi-block copolymer, and (B) a first skin layer in contact with the core layer. The first skin layer is composed of an ethylene-based polymer. The process includes releasing the elongating force from the elongated multilayer film to form a hazed multilayer film having a haze value greater than 30%. The process includes stretching the hazed multilayer film to form a stretched multilayer film having a clarity value of greater than 80%. The process includes relaxing the stretched multilayer film to form a relaxed multilayer film having a haze value greater than 30%.

1. Multilayer Film

The present process includes elongating a multilayer film. The multilayer film has at least two layers: (A) a core layer composed of an ethylene/α-olefin multi-block copolymer and (B) a first skin layer in contact with the core layer. The skin layer is composed of an ethylene-based polymer.

A. Core Layer (A)

The multilayer film includes a core layer. The core layer (A) includes an ethylene/α-olefin multi-block copolymer. The term "ethylene/α-olefin multi-block copolymer" includes ethylene and one or more copolymerizable α-olefin comonomer in polymerized form, characterized by multiple blocks or segments of two or more polymerized monomer units differing in chemical or physical properties. When referring to amounts of "ethylene" or "comonomer" in the copolymer, it is understood that this means polymerized units thereof. In some embodiments, the ethylene/α-olefin multi-block copolymer can be represented by the following formula:

(AB)$_n$

Where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows:

*AAA-AA-BBB-BB*

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 weight percent of the whole polymer. More preferably ethylene comprises at least 60 weight percent, at least 70 weight percent, or at least 80 weight percent, with the substantial remainder of the whole polymer comprising at least one other comonomer that is preferably an α-olefin having 3 or more carbon atoms, or 4 to 8 carbon atoms. In some embodiments, the ethylene/α-olefin multi-block copolymer may comprise 50 wt % to 90 wt % ethylene, or 60 wt % to 85 wt %, or 65 wt % to 80 wt %. For many ethylene/octene multi-block copolymers, the composition comprises an ethylene content greater than 80 weight percent of the whole polymer and an octene content of from 10 to 15, or from 15 to 20 weight percent of the whole polymer.

The ethylene/α-olefin multi-block copolymer includes various amounts of "hard" segments and "soft" segments. "Hard" segments are blocks of polymerized units in which ethylene is present in an amount greater than 90 weight percent, or 95 weight percent, or greater than 95 weight percent, or greater than 98 weight percent based on the weight of the polymer, up to 100 weight percent. In other words, the comonomer content (content of monomers other than ethylene) in the hard segments is less than 10 weight percent, or 5 weight percent, or less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an ethylene/α-olefin multi-block copolymer from 1 weight percent to 99 weight percent of the total weight of the ethylene/α-olefin multi-block copolymer, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Colin L. P. Shan, Lonnie Hazlitt, et al. and assigned to Dow Global Technologies Inc., the disclosure of which is incorporated by reference herein in its entirety. In particular, hard segment and soft segment weight percentages and comonomer content may be determined as described in Column 57 to Column 63 of U.S. Pat. No. 7,608,668.

The ethylene/α-olefin multi-block copolymer is a polymer comprising two or more chemically distinct regions or segments (referred to as "blocks") preferably joined (or covalently bonded) in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In one embodiment of this disclosure, the ethylene multi-block interpolymers are defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ and/or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299(\Delta H) + 62.81 \text{ for } \Delta H \text{ greater than zero and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G'(25° C.), and a storage modulus at 100° C., G'(100° C.), wherein the ratio of G'(25° C.) to G'(100° C.) is in the range of about 1:1 to about 9:1.

The ethylene/α-olefin multi-block copolymer may also have:

(F) molecular fraction which elutes between 40° C. and 130° C. when fractionated using TREF, characterized in that the fraction has a block index of at least 0.5 and up to about 1 and a molecular weight distribution, Mw/Mn, greater than about 1.3; and/or (G) average block index greater than zero and up to about 1.0 and a molecular weight distribution, Mw/Mn greater than about 1.3.

Suitable monomers for use in preparing the present ethylene/α-olefin multi-block copolymer include ethylene and one or more addition polymerizable monomers other than ethylene. Examples of suitable comonomers include straight-chain or branched α-olefins of 3 to 30, or 3 to 20, or 4 to 8 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, or 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In an embodiment, the ethylene/α-olefin multi-block copolymer is void of styrene (i.e., is styrene-free).

The ethylene/α-olefin multi-block copolymer can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793.

In an embodiment, the ethylene/α-olefin multi-block copolymer has hard segments and soft segments, is styrene-free, consists of only (i) ethylene and (ii) a $C_4$-$C_8$ α-olefin comonomer (and optional additives), and is defined as having:

a Mw/Mn from 1.7 to 3.5, at least one melting point, Tm, in degrees Celsius, and a density, d, in grams/cubic centimeter, where in the numerical values of Tm and d correspond to the relationship:

$$Tm < -2002.9 + 4538.5(d) - 2422.2(d)^2,$$

where d is from 0.86 g/cc, or 0.87 g/cc, or 0.88 g/cc to 0.89 g/cc;

and

Tm is from 80° C., or 85° C., or 90° C. to 95, or 99° C., or 100° C., or 105° C. to 110° C., or 115° C., or 120° C., or 125° C.

In an embodiment, the ethylene/α-olefin multi-block copolymer is an ethylene/octene multi-block copolymer (consisting only of ethylene and octene comonomer) with greater than 60 wt % ethylene and has one, some, any combination of, or all the properties (i)-(ix) below:

(i) a melt temperature (Tm) from 115° C., or 118° C., to 120° C., 123° C. or 125° C.; and/or (ii) a density from 0.860 g/cc, or 0.865 g/cc, or 0.870 g/cc, or 0.875 g/cc to 0.877 g/cc, 0.880 g/cc, or 0.885 g/cc, or 0.890 g/cc; and/or (iii) from 65 wt % to 91 wt % soft segment and from 9 wt % to 35 wt % hard segment; and/or (iv) from 16.4 mol %, or 17.0 mol %, or 17.5 mol % to 18.0 mol %, or 18.6 mol % octene in the soft segment; and/or (v) from 0.5 mol %, or 0.7 mol % to 0.8 mol %, or 0.9 mol %, or 1.0 mol % octene in the hard segment; and/or (vi) a melt index (MI) from 0.5 g/10 min, or 1 g/10 min, or 2 g/10 min, or 5 g/10 min, or 7 g/10 min to 10 g/10 min, or 15 g/10 min; and/or (vii) a Shore A hardness from 50, or 55, or 60, or 65, or 70 to 75, or 80, or 83, or 85; and/or (viii) an elastic recovery (Re) from 64%, or 70% to 75%, or 80%, or 85%, or 86% at 300% $\min^{-1}$ deformation rate at 21° C. as measured in accordance with ASTM D 1708; and/or (ix) a polydisperse distribution of blocks and a polydisperse distribution of block sizes.

In an embodiment, the ethylene/α-olefin multi-block copolymer is an ethylene/octene multi-block copolymer.

The present ethylene/α-olefin multi-block copolymer may comprise two or more embodiments disclosed herein.

In an embodiment, the ethylene/octene multi-block copolymer is sold under the Tradename INFUSE™ and is available from The Dow Chemical Company, Midland, Mich., USA. In a further embodiment, the ethylene/octene multi-block copolymer is INFUSE™ 9507.

In an embodiment, the ethylene/octene multi-block copolymer is INFUSE™ 9530.

B. Skin Layer

The present multilayer film includes a first skin layer in contact with the core layer (A). The skin layer is composed of an ethylene-based polymer. The ethylene-based polymer may be an ethylene homopolymer or an ethylene/α-olefin copolymer. Nonlimiting examples of suitable α-olefins include $C_3$-$C_{20}$ α-olefins, or $C_4$-$C_{20}$ α-olefins, or $C_3$-$C_{10}$ α-olefins, or $C_4$-$C_{10}$ α-olefins, or $C_4$-$C_8$ α-olefins. Representative α-olefins include propylene, 1-butene, 1-pentene, 1-hexene, 1-heptene and 1-octene. In an embodiment, the ethylene-based polymer does not contain an aromatic comonomer polymerized therein.

In an embodiment, the ethylene-based polymer is a linear polyethylene. Nonlimiting examples of linear polyethylene include LLDPE, ULDPE, VLDPE m-LLDPE, substantially linear, or linear, plastomers/elastomers, and combinations thereof.

In an embodiment, the ethylene-based polymer is a linear polyethylene that is an LLDPE and contains greater than 50 wt % units derived from ethylene, or from 51 wt %, or 55 wt %, or 60 wt % to 70 wt %, or 80 wt %, or 90 wt %, or 95 wt %, or 99 wt % units derived from ethylene, based on the weight of the LLDPE. The LLDPE contains a reciprocal amount of units derived from an α-olefin comonomer, or from less than 50 wt %, or 49 wt %, or 45 wt %, or 40 wt % to 30 wt %, or 20 wt %, or 10 wt %, or 5 wt %, or 1 wt % units derived from an α-olefin comonomer, based on the weight of the ethylene-based polymer.

In an embodiment, the ethylene-based polymer is an LLDPE and is an ethylene/$C_4$-$C_8$ α-olefin copolymer, and the LLDPE has one, some, or all of the following properties:

(a) a density from 0.910 g/cc, or 0.915 g/cc; or 0.920 g/cc to 0.925 g/cc, or 0.930 g/cc or 0.935 g/cc; and/or (b) a melt index from a melt index from 0.5 g/10 min, or 3 g/10 min, or 5 g/10 min, or 7 g/10 min, to 10 g/10 min, or 13 g/10 min, or 15 g/10 min; and/or (c) a melting point (Tm) from 90° C., or 100° C., or 110° C. to 120° C., or 130° C., or 135° C.

In an embodiment, the LLDPE is DOWLEX D2606 G available from The Dow Chemical Company.

3. Multilayer Film Structure

The first skin layer contacts the core layer. The multilayer film may include one or more intervening layers (i.e., inner layers). Each inner layer may be located between the core layer and the first skin layer. Each inner layer may be the same or different than other inner layers present in the multilayer film.

In an embodiment, the first skin layer (B) directly contacts the core layer (A). The term "directly contacts," as used herein, refers to a layer configuration whereby a first layer is located immediately adjacent to a second layer and no intervening layers or no intervening structures are present between the first layer and the second layer. In other words, the skin layer directly contacts the core layer such that no intervening layers are present between the core layer and the first skin layer.

In an embodiment, the first skin layer (B) directly contacts the core layer (A) and the multilayer film has a core-to-skin layer volume ratio from 4:1 to 8:1. In a further embodiment, the multilayer film has a core-to-skin layer volume ratio from 4:1, or 5:1, or 6:1, to 7:1, or 8:1 and the core layer (A) consists of the ethylene/α-olefin multi-block copolymer (and optional additives) and the first skin layer (B) consists of LLDPE (and optional additives).

In an embodiment, the multilayer film includes the core layer (A) positioned between the first skin layer (B) and a second skin layer (C), the second skin layer composed of ethylene-based polymer. In other words, the core layer is sandwiched between opposing skin layers. The composition of the skin layers may be the same or composition of the skin layers may be different. The thickness of the first skin layer (A) and the second skin layer (B) may be the same or different. In an embodiment, the composition of the first skin layer and the second skin layer is the same. In a further embodiment, the composition and the thickness of the first skin layer (A) is the same as the composition and thickness of the second skin layer (C).

One or more intervening (i.e., inner layers) may be located at first surface of the core layer (A) and the first skin layer (B). Similarly, one or more inner layers may be located between a second surface of the core layer (A) and the second skin layer (C).

In an embodiment, the multilayer film consists of three layers of first skin/core/second skin (B/A/C) configuration whereby each skin layer is in direct contact with the core layer. No intervening layer is present between the first skin layer and the core layer. No intervening layer is present between the second skin layer and the core layer. In other words, a first surface of the core layer is in direct contact with the first skin layer. A second (opposing) surface of the core layer is in direct contact with the second skin layer. The core layer consists of an ethylene/octene multi-block copolymer having a density from 0.860 g/cc to 0.887 g/cc. The first skin layer and the second skin layer have the same structure and composition, each skin layer consisting of an LLDPE having a density from 0.910 g/cc to 0.930 g/cc. The three layer film has a skin-to-core-to-skin layer volume ratio of 1:4-8:1. In other words, the three-layer multilayer film has a skin-to-core-to-skin layer ratio from 1:4:1, or 1:5:1, or 1:6:1 to 1:7:1, or 1:8:1.

In an embodiment, the multilayer film is free of propylene-based polymer, or is otherwise void of propylene-based polymer.

In an embodiment, the multilayer film is free of styrene, or is otherwise void of styrene. In a further embodiment, the multilayer film is free of both propylene-based polymer and is free of styrene.

4. Optional Additive(s)

The core layer (A), first skin layer (B), and/or second skin layer (C) may include one or more optional additives. Nonlimiting examples of suitable additive include slip agents, antiblock agents, antioxidants, antistatic agents, stabilizing agents, nucleating agents, colorants, pigments, ultra violet (UV) absorbers or stabilizers, flame retardants, compatibilizers, plasticizers, fillers, processing aids, antifog additive, crosslinking agents (e.g., peroxides), and combinations thereof.

5. Elongation

The present process includes elongating the multilayer film (in either the machine direction or in the transverse direction) to a impart a haze value greater than 30% to the multilayer film. The original (pre-elongated) multilayer film has an initial length and an initial transparency (haze less than 10%). In the original multilayer film, the ethylene-based polymer in the skin layer(s) has spherulites, with crystal lamellae packed tightly within the spherulites. In the original multilayer film, the molecular chains in the ethylene/α-olefin multi-block copolymer (of the core layer) are aligned in the machine direction due to the cast film process.

The elongation step entails elongating the multilayer film with an elongation force that is greater than the yield strength of the multilayer film.

The elongation step entails elongating the multilayer film in an amount from at least 150% to 300%. In an embodiment, the process includes elongating the multilayer film in an amount from 150%, or 175%, or 200%, or 225% to 250%, or 275%, or 280%, or 295%, or less than 300%.

Applicant discovered that elongation from 150% to 300% is sufficient to activate hazing in the multilayer film when the core layer (1) is composed of ethylene/α-olefin multi-block copolymer having a density from 0.860 g/cc to 0.887 g/cc, (2) the skin layer is an ethylene-based polymer, and (3) the multilayer film has a core: skin layer ratio from 4:1 to 8:1.

In the skin layer(s), the spherulites are broken down due to the strain applied from the elongation. The elongation results in the crystal lamellae in the skin layer(s) to align in the direction of the elongation force. When the elongation force is removed, the retractive force exerted by the ethylene/α-olefin multi-block copolymer core layer realigns the crystal lamellae. Light is reflected due to the reduced inter-lamellae distance, resulting in hazing. In the core layer, the strain applied from the elongation force increases the distance between the hard blocks, the hard blocks aligning in the direction of the elongation force. The elongation force activates hazing in the multilayer film. The term "activates hazing" is the initial step of elongation to change the clear film from the cast extrusion process to a hazy film, the hazy film forming upon release of the elongation force. Once the multilayer film is activated, the multilayer film exhibits high clarity (greater than 50% clarity) with subsequent stretching, and the multilayer exhibits high haze (greater than 30% haze) after removal of the stretching force.

The elongating step (or the elongation of the multilayer film) may be accomplished by nonlimiting procedures such as ring rolling, tenter framing, incremental stretching, or other suitable methods.

The process includes releasing the elongation force from the elongated multilayer film to form a hazed multilayer film. A "hazed multilayer film," as used herein, is the core/skin (or skin/core/skin) multilayer film with composition described above that is mono-axially oriented in the machine direction, the hazed multilayer film has a length from 1.5 times to 4.0 times the length of the original multilayer film, the hazed multilayer film having a haze value greater than 30%, or a haze from greater than 30%, or 40%, or 50%, or 60%, or 70% to 80%, or 90%, or 95%. In the core layer of the hazed multilayer film, the elastic nature of the ethylene/α-olefin multi-block copolymer enables the block polymer chains to return to the original morphology, i.e., the morphology of the multi-block polymer chains prior to the elongation step. In other words, in the hazed multilayer film, the removal of the elongation force reduces the distance between the hard blocks, returning the multi-block polymer chains to their original morphology.

The process includes stretching the hazed multilayer film to form a stretched multilayer film having a clarity value from greater than 80%, or 85%, or 90%, or 92%, or 94% to 95%, or 97%, or 99%, or 100%. In an embodiment, the stretched multilayer film has a clarity value as previously stated in this paragraph and also has a haze value from 0%, or greater than 0%, or 1%, or 2%, or 3%, or 4%, or 5% to 6%, 7%, or 8%, or 9%, or less than 10%.

When the stretching force is applied to the hazed multilayer film, the block polymer chains in the ethylene/α-olefin multi-block copolymer of the core layer align in the direction of the stretch force. The stretch force increases the distance between the hard blocks in the ethylene/α-olefin multi-block copolymer. In the skin layer(s), the crystal lamellae of the ethylene-based polymer re-orient themselves in the direction of the stretching force. While the stretch force is applied, the inter-lamellae distance of the crystal lamellae in the ethylene-based polymer of the skin layer(s) is not close enough to interfere with light passing through. Consequently, haze is reduced, bringing transparency to the stretched multilayer film. The stretched multilayer film has clarity greater than 80% and a haze less than 10% in the ranges stated in the immediately preceding paragraph.

The process includes relaxing the stretched multilayer film to form a relaxed multilayer film having a haze value greater than 30%, or greater than 50%. The term "relaxing," (and like terms) as used herein, refers to the removal of the stretching force imparted on the stretched multilayer film. Relaxing the stretched multilayer film results in hazing to occur again. In an embodiment, the relaxed multilayer film has a haze value from greater than 30%, or 40%, or 50%, or 60%, or 70%, or 80% to 90%, or 95%, or 99%.

In an embodiment, the relaxed multilayer film returns to the condition or state of the hazed multilayer film. In other words, the relaxed multilayer film has the same structure, composition, and properties of the hazed multilayer film.

The stretching step and the relaxing step may be repeated to provide the same haze/clarity values in the respective stretched multilayer film and the relaxed multilayer film previously disclosed.

Applicant discovered that (1) an elongation procedure entailing 150%-300% elongation in conjunction with (2) the multilayer film structure from 4:1 to 8:1 core: skin, and along with (3) multi-block ethylene/α-olefin copolymer with density from 0.860 g/cc to 0.887 g/cc, and (4) an ethylene-based polymer skin layer unexpectedly promotes the reversible haze phenomenon exhibited by the hazed multilayer film.

Bounded by no particular theory, it is believed that co-extrusion of multilayer film with ethylene/octene multi-block copolymer core layer (INFUSE™) with LLDPE skin layers with a core-to-skin volume ratio of 4:1 to 8:1 induces significant strain rates which influence the alignment of LLDPE crystal lamellae when the skin layers are elongated and elongation force is subsequently released. Initial elongation during the activation will result in the breakdown of the spherulites in the LLDPE. This initial elongation force or strain applied to the LLDPE skin layers breaks down spherulites and the crystal lamellae orientation to reflect light due to the retractive force from the ethylene/octene multi-block copolymer (INFUSE™) core after the removal of the elongation force. The removal of the elongation force results in close inter-lamellae spacing which reflect light. However, due to the elasticity of ethylene/octene multi-block copolymer (INFUSE™), Applicant discovered that the crystal lamellae can re-orientate when subjected to subsequent mechanical stretching, allowing visible light to pass through when stretched. Due to the subsequent stretching, the crystal lamellae re-orientate in the direction of the stretching force, with the inter-lamellae spacing being wide enough for light to pass through. Removal of the stretching force results in the ethylene/octene multi-block copolymer (INFUSE™) core layer to again exert a retractive force to realign the crystal lamellae and reflect light. Such a change in the orientation of the crystal lamellae in the skin layers of the co-extruded structure produces the unexpected optical phenomenon of reversible hazing.

Nonlimiting examples of applications for the present multilayer film with reversible haze include visible light control applications such as:

green house films applications (UV additives can be added into the skin layers and the present multilayer film can serve as a substitute for electrochromic windows);

film that indicates a critical strain by transitioning from a hazy film to a clear film when the right strain is applied such as bandages, diaper fasteners, and food wrap;

tamper proof seals—clear stretched film placed over an article before sealing, the stretched film is clear when not tampered, breaking of the seal (tampering) relaxes the stretched film, the relaxed film is hazy.

By way of example, and not limitation, some embodiments of the present disclosure will now be described in detail in the following Examples.

EXAMPLES

1. Materials

The materials used to produce multilayer films are provided in Table 1 below.

TABLE 1

Materials for multilayer films

| Material | Composition | MI | Density (g/cc) | Source |
|---|---|---|---|---|
| ethylene/α-olefin multi-block copolymer | Ethylene/octene multi-block copolymer | 5.0 | 0.865 | INFUSE 9507 The Dow Chemical Company |
| ethylene/α-olefin multi-block copolymer | Ethylene/octene multi-block copolymer | 5.0 | 0.887 | INFUSE 9530 The Dow Chemical Company |
| LLDPE | ethylene/octene copolymer | 4.0 | 0.920 | DOWLEX 2606G The Dow Chemical Company |
| Anti-block agent | 5 wt % amorphous silica based in 95 wt % LDPE | — | — | POLYBATCH AB5, A. Schulman |
| Slip agent | 5% erucamide slip concentrate based in polyethylene | — | — | POLYBATCH ® CE-505-E, A. Schulman |

2. Fabrication of Multilayer Films

Monolayer films and 3-layer multilayer films with skin/core/skin configuration are fabricated using the materials in Table 1 under the cast extrusion parameters provided in Table 2 below. Extruders B and C form the core layer. Extruders A and D form the skin layers.

TABLE 2

Fabrication conditions for 3-layer films (skin/core/skin)

| | Dr. Collin GmbH Coextrusion | | | | | | | | flat film line | |
|---|---|---|---|---|---|---|---|---|---|---|
| | 325A-34-11 | | 325B-34-11 | | 3300-34-11 | | 325C-34-11 | | ABCBD | |
| | A | | B | | C | | D | | DIE | |
| layer | set | act | set | act | Set | act | set | act | set | Act |
| inlet | 30 | 31 | 30 | 30 | 30 | 24 | 30 | 24 | coex 1 (9) 230 | 230 |
| cylinder 1 | 180 | 180 | 180 | 180 | 180 | 180 | 180 | 180 | coex 2 (10) 230 | 230 |
| cylinder 2 | 190 | 188 | 190 | 190 | 190 | 192 | 190 | 191 | die back (9) 230 | 229 |
| cylinder 3 | 190 | 193 | 220 | 220 | 230 | 230 | 190 | 188 | die mid (10) 230 | 230 |
| cylinder 4 | 200 | 198 | 220 | 219 | 230 | 230 | 190 | 190 | die front (11) 230 | 230 |
| cylinder 5 | 0 | 26 | 0 | 9999 | 0 | 9999 | 0 | 9999 | | |
| adapter 1 | 210 | 210 | 230 | 230 | 230 | 230 | 210 | 211 | | |
| adapter 2 | 210 | 210 | 230 | 230 | 230 | 230 | 210 | 210 | | |
| screw | 45 | 17 | 45 | 42 | 16 | 30 | 45 | 15 | rpm | |
| m-current | | 1.0 | | 1.7 | | 2.8 | | | A | recipe: |
| melt-temp. | | 188 | | 213 | | 208 | | | ° C. | 1116RHC035#294682-953427 |
| melt-press. | | 69 | | 70 | | 80 | | | bar | remarks: |
| feeding | 0.700 | 0.701 | 2.000 | 1.999 | 2.720 | 2.713 | | | kg/h | A/B/C/B/D |
| error | OK | 0 | OK | 0 | OK | 0 | | | | 5-LAYER COEX |
| | error-list | | error-list | | error-list | | error-list | act. total | | A&D: 92% D2606G + |
| | heating ON | | heating ON | | heating ON | | heating ON | throughput: | | 2% CE 505 + 6% AB5 |
| | screw ON | | screw ON | | screw ON | | screw ON | 5.992 kg/h | | B&C: 100% INFUSE 9507 |
| | feed c. ON | | feed c. ON | | feed c. ON | | feed c. ON | | | LINE SPEED: 11.7 |
| | | | | | | | | | | CHILLTEMP: 250° C. |
| | | | | | | | | | | WIDTH: 200 mm |
| | | | | | | | | | | L/R: 1/8/1 |

The structure and properties of the multilayer films and 3-layer multilayer films produced under the cast extrusion conditions of Table 2 are shown in Table 3 below.

TABLE 3

Structure and composition of 50 μm thick cast extruded films

| Sample ID | Skin* | Core | Skin* | Onset of activation (see Table 4 below) |
|---|---|---|---|---|
| Inventive 1A Layer ratio | LLDPE1 | INFUSE 95078 | LLDPE1 | 150% |
| Inventive 1B Layer ratio | LLDPE1 | INFUSE 95074 | LLDPE1 | 300% |
| Comparative 1C Layer ratio | LLDPE1 | INFUSE 95072 | LLDPE1 | N/A |
| Comparative 1D Layer ratio | LLDPE1 | INFUSE 95308 | LLDPE1 | Greater than 300% |
| Comparative 1E | n/a | INFUSE 9507 Monolayer | n/a | N/A |
| Comparative 1F | n/a | INFUSE 9530 Monolayer | n/a | N/A |

*skins are 92 wt % LLDPE, 6 wt % anti-block agent, and 2 wt % slip agent based on total weight of the skin layer The films in Table 3 are prepared into sample strips with dimensions 10 cm long by 40 mm wide by 50 μm thick. Each sample is stretched using a Zwick Model Z10 Tensile Tester at 500 mm/min from 20% elongation to 300% elongation in order to evaluate the activation point of initial hazing for each sample. After activation, the samples are relaxed. After relaxation, the samples are stretched at 150% on a metallic frame and evaluated for haze. The properties of the samples are shown in Table 4 below.

TABLE 4

Evaluation of Activation of Hazing at various elongation. Dimension for each pre-elongated film in Table 4 is 10 cm × 40 mm wide × 50 μm thick.

| | Inventive 1A | | Inventive 1B | | 1D | |
|---|---|---|---|---|---|---|
| Elongation (Activation) | Permanent increase in length (cm) | Haze# (%) | Permanent increase in length (cm) | Haze# (%) | Permanent increase in length (cm) | Haze# (%) |
| 20% | 0 | 6.53 | 0 | 5.76 | 0 | 4.9 |
| 40% | 0.05 | 6.28 | 0.1 | 5.66 | 0.1 | 5.1 |
| 60% | 0.1 | 6.64 | 0.25 | 5.59 | 0.2 | 5.54 |
| 80% | 0.25 | 6.86 | 0.4 | 6.04 | 0.35 | 6.04 |
| 100% | 0.35 | 8.3 | 0.6 | 7.08 | 0.45 | 8.17 |
| 150% | 1.7 | 82.9 Activation occurs at 150% | 2.0 | 16.7 | 2.0 | 11.2 |
| 200% | 3.0 | 85.1 | 4.0 | 17.3 | 2.2 | 13.2 |
| 250% | 4.0 | 90.1 | 5.4 | 43.8 | 3.25 | 16.5 |
| 300% | 4.5 | 89.8 | 5.75 | 84.3 activation occurs at 300% | 4.9 | 43.9 activation occurs at greater than 300% | haze value is measured on hazed films (elongation/activation, removal of elongation force, then measurement of haze)
elongation data for Comparative 1E, 1F not provided-monolayer films 1E, 1F show no activation to hazing From Table 4, the starting point (activation step) of hazing for multilayer films 1A, 1B, and 1D are tabulated. It is observed that Inventive 1A starts to haze at 150% elongation, whereas inventive 1B starts to haze at 300% elongation. Sample 1D starts to haze at greater than 300% elongation. Applicant discovered that by (1) controlling the layer ratio to 1:4:1 to 1:8:1 and (2) controlling the density of the ethylene/α-olefin multi-block copolymer (INFUSE™ material) to 0.860 g/cc to 0.887 g/cc, it is possible to reduce the activation of hazing to 150% elongation.

Example 2

The reversible haze phenomenon for hazed multilayer film Inventive 1A is evaluated under repeated stretch/relax scenarios. Hazed multilayer film Inventive 1A from Table 4 is cyclically stretched at 150% elongation and relaxed. Haze and clarity are measured at each stage and shown in Table 5 below.

TABLE 5

Properties of Hazed multilayer film Inventive 1A after cyclic stretch/release

| Inventive 1A | Haze | Clarity |
|---|---|---|
| Hazed 1A (after elongation and subsequent/relaxation) | 84.2 | 28.6 |
| 1st Stretched 1A | 6.72 | 88.5 |
| 1st Released 1A | 86.7 | 19.2 |
| 2nd Stretch 1A | 6 | 89.1 |
| 2nd Release 1A | 89.6 | 18.3 |

Example 3

Multilayer film Inventive 1A from Table 3 (pre-elongation) is evaluated under several different activation scenarios to evaluate haze properties.

Sample 1A is subjected to three elongation conditions to activate hazing (with subsequent film relaxation) to form the hazed multilayer film. A Machine Direction Orientation (MDO) machine is utilized for continuous stretching during in-line casting of the film.

Elongation condition 1-150% elongation at ambient temperature; Elongation condition 2-250% elongation at ambient temperature; and Elongation condition 3-250% elongation at ambient temperature followed by an annealing step at 70° C. Results are provided below in respective Tables 6, 7, and 8 below.

TABLE 6

Elongation condition 1-150% elongation at ambient temperature

Chill-roll + MDO + winder

| | Speed (m/min) | | Set | Calc. | Power | Temp (° C.) | | Tension (N) | |
|---|---|---|---|---|---|---|---|---|---|
| | Set | Act | % | m/min | m/min | Set | Act | Set | Act |
| Unwinder 1(u) | | | 1.0 | | | | | 30 | 0 |
| Unwinder 2(l) | | | 1.0 | | | Gap-pre (bar) | | 32 | 0 |
| Chill-roll | 2.00 | 2.00 | | | 11 | 50 | 0 | | |
| cr: take-off | | 0.00 | 1.0 | 2.02 | 0 | | | | |
| cr: winder | | | | set 1.2 | 12 | | | | |
| Blower | | 90 | | | | | | | |
| *MDO-D1 | | 2.05 | 2.6 | 2.07 | 35 | 30 | 31 | 10 | 22 |
| MDO-D2 | | 2.05 | 0.0 | 2.07 | 39 | 30 | 31 | | |
| MDO-D3 | | 3.08 | 1.5 x | 3.11 | 18 | 30 | 31 | | |
| MDO-D4 | | 3.08 | 0.0 | 3.11 | 8 | 30 | 33 | | |
| MDO-D5 | | 3.08 | 0.0 | 3.11 | 9 | 30 | 31 | | |
| MDO-D6 | | 3.08 | 1.0 x | 3.11 | 14 | 30 | 31 | | |
| MDO-D7 | | 3.08 | 0.0 | 3.11 | 7 | | | | |
| MDO-D8 | | 3.08 | 0.0 | 3.11 | 10 | | | | |
| Take-off | | 3.3 | −1.0 | Set 3 | 3 | (100 PI) | | 5 | 23 |
| Winder | | | | Set 3 | 3 | | | 21 | |
| | | | | 1.5 elongation ratio | | | | | |
| Ramp time | 20 | | | | | | | | |
| Length | 4000 | 11 | | Remarks: (1.5)x elongation | | | | | |

*MDO—machine direction orientation

TABLE 7

Elongation condition 2-250% elongation at ambient temperature

Chill-roll + MDO + winder

| | Speed (m/min) | | Set | Calc. | Power | Temp (° C.) | | Tension (N) | |
|---|---|---|---|---|---|---|---|---|---|
| | Set | Act | % | m/min | m/min | Set | Act | Set | Act |
| Unwinder 1(u) | | | 1.0 | | | | | 30 | 0 |
| Unwinder 2(l) | | | 1.0 | | | Gap-pre (bar) | | 32 | 0 |
| Chill-roll | 2.00 | 2.00 | | | 12 | 50 | 0 | | |
| cr: take-off | | 1.99 | 1.0 | 2.02 | 0 | | | | |
| cr: winder | | | | set 1.2 | 12 | | | | |
| Blower | | 90 | | | | | | | |
| *MDO-D1 | | 2.03 | 0.5 | 2.03 | 35 | 30 | 31 | 10 | 20 |
| MDO-D2 | | 2.03 | 0.0 | 2.03 | 40 | 30 | 30 | | |
| MDO-D3 | | 5.08 | 2.5 x | 5.08 | 21 | 30 | 31 | | |
| MDO-D4 | | 5.08 | 0.0 | 5.08 | 9 | 30 | 34 | | |
| MDO-D5 | | 5.08 | 0.0 | 5.08 | 10 | 30 | 31 | | |
| MDO-D6 | | 5.08 | 1.0 x | 5.08 | 16 | 30 | 30 | | |
| MDO-D7 | | 5.08 | 0.0 | 5.08 | 7 | | | | |
| MDO-D8 | | 5.07 | 0.0 | 5.08 | 12 | | | | |
| Take-off | | 4.0 | −1.0 | Set 3 | 3 | (100 PI) | | 5 | 11 |
| Winder | | | | Set 3 | 3 | | | 21 | |
| | | | | 2.5 elongation ratio | | | | | |
| Ramp time | 20 | | | | | | | | |
| Length | 4000 | 11 | | Remarks: (2.5)x elongation | | | | | |

*MDO—machine direction orientation

TABLE 8

Elongation condition 3-250% elongation at ambient temperature

| | Chill-roll + MDO + winder | | | | | | | | |
|---|---|---|---|---|---|---|---|---|---|
| | Speed (m/min) | | Set | Calc. | Power | Temp (° C.) | | Tension (N) | |
| | Set | Act | % | m/min | m/min | Set | Act | Set | Act |
| Unwinder 1(u) | | | 1.0 | | | | | 30 | 0 |
| Unwinder 2(l) | | | 1.0 | | | Gap-pre (bar) | | 32 | 0 |
| Chill-roll | 2.00 | 2.00 | | | 12 | 50 | 0 | | |
| cr: take-off | | 2.01 | 1.0 | 2.02 | 0 | | | | |
| cr: winder | | | | set 1.2 | 12 | | | | |
| Blower | | | 90 | | | | | | |
| *MDO-D1 | | 1.98 | −2.1 | 1.98 | 36 | 30 | 30 | 10 | 23 |
| MDO-D2 | | 1.98 | 0.0 | 1.98 | 43 | 30 | 30 | | |
| MDO-D3 | | 4.95 | 2.5 x | 4.94 | 21 | 30 | 30 | | |
| MDO-D4 | | 4.95 | 0.0 | 4.94 | 0 | 30 | 30 | | |
| MDO-D5 | | 4.95 | 0.0 | 4.94 | 10 | 45 | 46 | | |
| MDO-D6 | | 4.95 | 1.0 x | 4.94 | 17 | 70 | 72 | | |
| MDO-D7 | | 4.95 | 0.0 | 4.94 | 10 | | | | |
| MDO-D8 | | 4.04 | 0.0 | 4.94 | 0 | | | | |
| Take-off | | 4.8 | −1.0 | Set 3 | 4 | (100 PI) | | 5 | 19 |
| Winder | | | | Set 3 | 3 | | | 21 | |
| | | | | 2.49 elongation ratio | | | | | |
| Ramp time | 20 | | | | | | | | |
| Length | 4000 | 20 | | Remarks: (2.5)x elongation 1-45 2-70 | | | | | |

*MDO—machine direction orientation

Although activation can occur at 150%, Applicant discovered condition 2 with 250% stretch is favorable for continuous industrial production of multilayer film with reversible haze.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A process comprising:
    elongating a multilayer film from at least 150% to less than or equal to 300% elongation to a impart a haze value greater than 30% to the multilayer film, the multilayer film having at least three layers
    (A) a core layer consisting of an ethylene/α-olefin multi-block copolymer consisting of (i) ethylene and (ii) a C4-C8 α-olefin comonomer, and having a density from 0.865 g/cc to 0.880 g/cc,
    (B) a first skin layer in direct contact with the core layer, the skin layer composed of an ethylene-based polymer,
    (C) a second skin layer in direct contact with the core layer, the skin layer composed of an ethylene-based polymer, and multilayer film having a layer volume ratio of skin layer (C)-core layer (A)-to-skin layer (B) from 1:4:1 to 1:8:1;
    releasing the elongating force from the elongated multilayer film to form a hazed multilayer film having a haze value greater than 30%, the haze measured in accordance with ASTM D1003;
    stretching the hazed multilayer film to form a stretched multilayer film having a clarity value greater than 80%, the clarity measured in accordance with ASTM D 1746-15; and
    relaxing the stretch force from the stretched multilayer film to form a relaxed multilayer film having a haze value greater than 30%,
    wherein strain-stress behavior for the elongating, the releasing, the stretching and the relaxing is measured at 500 mm/min at a 25° C., in accordance with ASTM D5459.

2. The process of claim 1 wherein the elongating step comprises elongating the multilayer film from at least 150% elongation to less than 300% elongation.

3. The process of claim 1 wherein the elongation step imparts a haze value greater than 30% onto the hazed multilayer film.

4. The process of claim 1 wherein the elongating step activates hazing in the multilayer film.

5. The process of claim 1 comprising providing a multilayer film having (A) the core layer consisting of an ethylene/$C_4$-$C_8$ α-olefin multi-block copolymer having density from 0.860 g/cc to 0.890 g/cc; (B) the first skin layer comprising a linear low density polyethylene having a density from 0.910 g/cc to 0.935 g/cc, and (c) the second skin layer comprising a linear low density polyethylene having a density from 0.910 g/cc to 0.935 g/cc, the density measured in accordance with ASTM D792.

6. A multilayer film comprising:
    (A) a core layer consisting of an ethylene/α-olefin multi-block copolymer consisting of (i) ethylene and (ii) a C4-C8 α-olefin comonomer, and having a density from 0.865 g/cc to 0.880 g/cc;
    (B) a first skin layer in direct contact with the core layer;
    (C) a second skin layer in direct contact with the core layer;
    the multilayer film is a mono-axially oriented hazed multilayer film and has a haze value greater the 30%, the hazed multilayer film has a layer volume ratio of skin layer (C)-core layer (A)-to-skin layer (B) from 1:4:1 to 1:8:1; and
    the hazed multilayer film exhibits a clarity value greater than 80% when subjected to a stretching force from at least 150% elongation to less than or equal to 300% elongation, the hazed multilayer film further exhibiting a haze value greater than 30% when the stretching force is removed,
the haze measured in accordance with ASTM D1003 and the clarity measured in accordance with ASTM D 1746-15.

7. The multilayer film of claim 6 wherein the hazed multilayer film is a relaxed multilayer film when the stretching force is removed.

8. The multilayer film of claim 7 wherein the first skin layer directly contacts the core layer.

9. The multilayer film of claim 6 comprising a second skin layer (C), the first layer (B) in direct contact with a first surface of the core layer (A) and the second skin layer (C) in direct contact with a second surface of the core layer (A), the second skin layer composed of an ethylene-based polymer.

10. The multilayer film of claim 9 wherein the skin (B)-core (A)-skin layer (C) volume ratio is from 1:4:1 to 1:8:1.

11. A process comprising:
elongating a multilayer film from at least 150% to less than or equal to 300% elongation to a impart a haze value greater than 30% to the multilayer film, the multilayer film having a core layer (A) positioned between a first skin layer (B) and a second skin layer (C), the haze measured in accordance with ASTM D1003,
(A) the core layer consisting of an ethylene/α-olefin multi-block copolymer consisting of (i) ethylene and (ii) a C4-C8 α-olefin comonomer, and having a density from 0.860 g/cc to 0.887 g/cc, and optional additives,
(B) the first skin layer in contact with the core layer (A), the first skin layer consisting of a linear low density polyethylene having a density from 0.910 g/cc to 0.930 g/cc, and optional additives,
(C) the second skin layer in contact with the core layer, the second skin layer consisting of a linear low density polyethylene having a density from 0.910 g/cc to 0.930 g/cc, and optional additives;
and the multilayer film having a volume ratio of skin:core:skin layer from 1:4:1 to 1:8:1;
releasing the elongating force from the elongated multilayer film to form a hazed multilayer film having a haze value greater than 30%;
stretching the hazed multilayer film to form a stretched multilayer film having a clarity value greater than 80%, and a haze value less than 9%, the clarity measured in accordance with ASTM D 1746-15; and
relaxing the stretch force from the stretched multilayer film to form a relaxed multilayer film having a haze value greater than 30%,
wherein strain-stress behavior for the elongating, the releasing, the stretching and the relaxing is measured at 500 mm/min at a 25° C., in accordance with ASTM D5459.

12. The process of claim 11 wherein each skin layer is in direct contact with the core layer.

13. The process of claim 12 wherein the multilayer film consists of three layers.

14. The process of claim 13 wherein the linear low density polyethylene in the first skin layer is the same as the linear low density polyethylene in the second layer.

15. The process of claim 14 wherein the ethylene/α-olefin multi-block copolymer has a density from 0.860 g/cc to 0.870 g/cc.

* * * * *